June 15, 1948.  A. C. WICKMAN  2,443,410
MACHINE FOR GRINDING TOOTHED GEAR WHEELS AND ANALOGOUS BODIES
Filed April 26, 1946
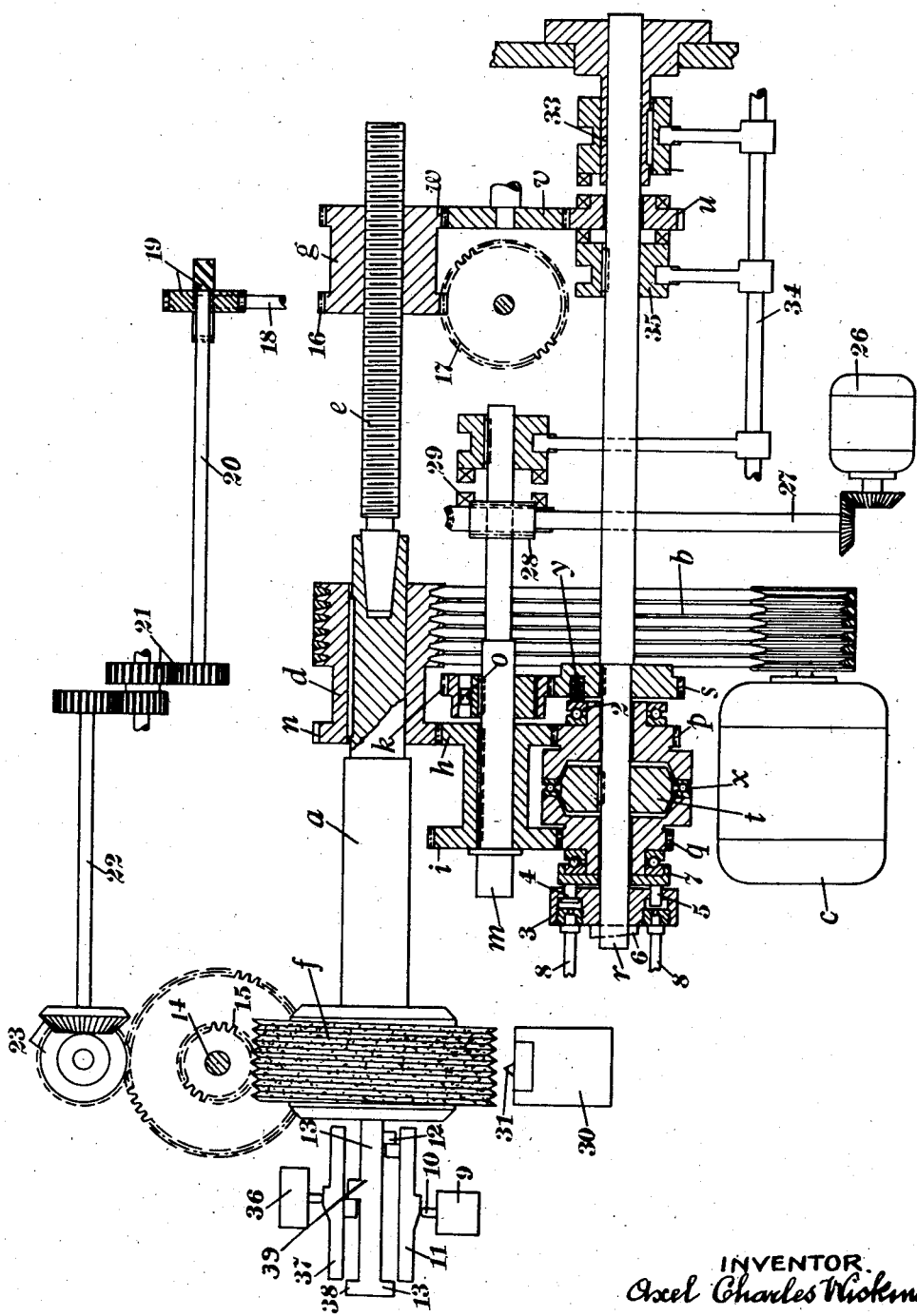
INVENTOR.
Axel Charles Wickman
By Stanley Lightfoot.
Attorney.

Patented June 15, 1948

2,443,410

UNITED STATES PATENT OFFICE 2,443,410

MACHINE FOR GRINDING TOOTHED GEAR WHEELS AND ANALOGOUS BODIES

Axel Charles Wickman, Coventry, England

Application April 26, 1946, Serial No. 665,145
In Great Britain May 3, 1945

6 Claims. (Cl. 51—52)

This invention relates primarily to machines for grinding the teeth of gear wheels and of the kind in which the grinding is effected by means of a grinding wheel having an operative peripheral surface of helical form, but it may be applied to machines of the said kind for other analogous uses, such as the grinding of splined shafts or other shaped work pieces capable of being treated by rotational engagement with such a grinding wheel. In particular the invention relates to machines in which the work piece and grinding wheel are not only given rotational motion but also a relative sliding movement parallel with the axis of the grinding wheel. In such machines the sliding movement necessitates the introduction of a compensatory motion in the relative rotation of the work piece and grinding wheel. If the sliding motion were absent, the work piece would be rotated relatively to the grinding wheel at the speed which would normally result if it derived its motion from the grinding wheel. But when the said relative sliding movement is employed, it is necessary to increase the normal relative rate of rotation during the movement in one direction and decrease it in the opposite direction, this increase and decrease being what is ordinarily known in this connection as the compensatory motion.

The primary object of the present invention is to provide an improved machine which enables the compensatory motion to be imparted in a simple and satisfactory manner.

The invention comprises a machine in which all the motions required in the grinding operation are derived from a common source, and in which the relative sliding movement of the grinding wheel and work piece is effected through a screw and nut mechanism having associated with it means for effecting relative rotations of the nut and screw at different speeds, the rotation of the work piece being dependent upon rotation of the nut and screw mechanism.

The accompanying drawing illustrates diagrammatically one embodiment of the invention.

In applying the invention as shown by the diagram to a machine for grinding gear wheels, there is employed a grinding wheel spindle $a$ adapted to receive both rotary and axial sliding motions, this spindle being adapted to be driven through belt or other gearing $b$ from an electric motor $c$ or other convenient source of motion through a sleeve $d$ in spline connection with the spindle $a$, the sleeve receiving only rotary motion. One end of the spindle $a$ has associated with it a screw $e$ having a pitch corresponding to that of the helix on the grinding wheel $f$, and on the screw is mounted a rotary nut $g$ which is restrained from axial movement. The sleeve $d$ is connected to the nut $g$ through any convenient change speed gearing which is controllable automatically in response to the sliding movements of the spindle $a$.

In the example illustrated the gearing comprises wheels $h, i, k$ of different diameters mounted on a shaft $m$, the wheels $h, i$ being keyed to the shaft and the wheel $k$ being connected to the shaft by a unidirectional clutch $o$. The wheels $h, i$ mesh with wheels $p, q$ of correspondingly different diameters which are freely and slidably mounted on a shaft $r$, and the wheel $k$ meshes with a corresponding wheel $s$ keyed to the shaft $r$. Motion is taken from the shaft $r$ to the nut $g$ through wheels $u, v$ and $w$, the latter being formed on or secured to the nut. The wheel $h$ meshes with a wheel $n$ formed on or secured to the sleeve $d$. The wheels $n, h, p$ are of equal diameters, as are also the wheels $u, w$. Consequently when motion is transmitted from $n$ to $w$ through the wheels $h, p,$ the nut is rotated at the same speed as the sleeve. When the motion is transmitted through wheels $i, q,$ the nut is driven at a faster rate than the sleeve, and when the motion is transmitted through the wheels $k, s$ the nut is driven at a slower rate than the sleeve.

For the control of the gearing we mount between the wheels $p, q$ on the shaft $r$ a clutch member $t$ which is secured to the said shaft, and between the adjacent faces of the said wheels is mounted a thrust ring of balls $x$. Between the wheel $s$ and an adjacent abutment 2 on the wheel $p$ is arranged a plurality of springs $y$ (one only of which is shown in the diagram), which serve to move the wheel $p$ in engagement with the clutch member $t$ and the wheel $q$ out of engagement with the said member. In association with the wheel $q$ there is freely mounted on the shaft $r$ a stationary block 3 having cylindrical cavities in which are contained fluid operable plungers 4, 5. The block is supported against endwise movement in any convenient manner, as, for example, by a collar 6 on the shaft, and the outer ends of the plungers bear against an abutment 7. The plunger 4 has a limited range of movement which is restricted by a head on the inner end of the plunger, but the plunger 5 can be moved outwardly to a greater extent than the plunger 4. The purpose of the plunger 4 is to move the wheels $p, q,$ to their neutral position relatively to the clutch member $t$. The plunger 5 serves to move the wheel $q$ into engagement with the said member.

Fluid pressure is supplied to the plungers 4, 5 from any convenient source through pipes 8. The pressure on the plunger 4 is exerted continuously, but the pressure exerted on the plunger 5 is under the control of a valve 9 the movable member of which is provided with a stem 10 which can be actuated by an endwise slidable ramp 11, the latter being moved in the appropriate direction when the spindle a reaches either end of its axial movement, through tappets 12 on an extension 13 of the spindle a which strike against a projection on the ramp.

The rotation of a spindle 14 carrying the work piece 15 is derived from the nut g (which is provided with gear wheel teeth 16) and any appropriate supplementary gearing whereby the work piece can be rotated at a speed appropriate to the number of teeth on the work piece to be ground. In the example shown, the wheel 16 rotates a wheel 17 which transmits motion to the spindle 14 through a spindle 18, gear wheels 19, shaft 20, change speed gear wheels 21, spindle 22 and gear wheels 23. The change speed wheels 21 are replaceable by any combination of wheels adapted to give the required speed ratio between the nut g and work piece 15.

The arrangement is such that rotation of the nut g relatively to the screw e at two different speeds is effected respectively through the wheels k, s, and i, q. When the wheels k, s are in action the rotary grinding wheel spindle a is moved axially in one direction, and when the wheels i, q are in action the spindle is moved axially in the opposite direction. In the event of accidental or other failure of the fluid pressure, the springs y will cause the wheel p to engage the clutch element and so cause the nut to be rotated at the same speed as the screw thus preventing axial movement of the spindle a.

It will be understood that the accompanying drawing is purely diagrammatic, but it will suffice to enable the sequence of operations to be easily understood. With fluid pressure acting on the plunger 4 the wheels p, q are held in their neutral position in which they are free from the clutch member t. Motion is now given to the nut g through the wheels k, s at a slower rate than that of the screw, and the latter then causes the spindle a to move to the right. At the end of this movement the ramp 11 opens the valve 9 causing pressure fluid to be admitted to 5. The plunger 5 then moves the wheel q into engagement with the clutch member t, causing the nut g to rotate faster than the screw e, and thereby causing the spindle a to move to the left, the speed of the nut being changed at each end of the traverse of the spindle a. But, as already mentioned, if the fluid pressure fails to act, the wheel p will be engaged with t and the nut will then rotate at the same speed as the screw, thus preventing axial movement of the screw. As a consequence of the nut being rotated at different speeds during the opposite axial movements of the grinding wheel spindle, the work piece spindle 14 is also rotated at different speeds, and the difference of the rates of rotation of the grinding wheel and work piece compensates the axial movements of the grinding wheel.

By means of this invention the desired principal object above mentioned is attained in a very simple and convenient manner. The invention is not, however, restricted to the example described as the essential features of the invention may be embodied in a variety of forms.

For periodic trimming of the grinding wheel f, there is employed a reversible electric motor 26 (or other convenient source of motion) for driving the grinding wheel spindle a (during the trimming operation) through gearing 27, 28, clutch 29 and the gear wheels h, n, and in association with the grinding wheel f on the spindle a is employed a slide 30 carrying a trimming tool 31 which can be moved by the slide into and out of engagement with the grinding wheel. The nut g is clutched by a clutch 32 to a fixed part 33 to hold it against rotation during the trimming operation, the normal driving mechanism associated with the nut being temporarily disconnected (by a clutch member 34 connected with the clutch 29) during the trimming action, the clutches, 29, 32 and 34 being operable by a common actuating member 35.

By the interaction of the nut and screw the grinding wheel is given the desired axial sliding movement relatively to the trimming tool while the spindle a is being rotated, and at the end of each traverse the direction of the motor (or other source) is reversed automatically by the action of a switch or other means controlled by the spindle, or under manual control. In the example shown a reversing switch 36 is actuated by a slidable ramp 37 under the action of projections 38, 39 on the spindle extension 13 which strike a projection on the ramp. During the trimming operation the wheels p, q are held out of engagement with the clutch member t, and the motor c is inoperative.

Having thus described my invention, what I claim as new and desire to secure by Letters Patent is:

1. A grinding machine of the kind specified, comprising in combination a source of rotary motion, a grinding wheel spindle, means operable by said source for rotating said grinding wheel spindle, a work spindle, a screw and nut mechanism for effecting relative sliding movement of said grinding wheel spindle and work spindle, means for transmitting relative rotation at different speeds and in the same direction to the screw and nut of said mechanism from said source, and means operable by said screw and nut mechanism for imparting rotary motion to the work spindle.

2. A grinding machine of the kind specified, comprising in combination a source of rotary motion, a rotatable and axially slidable grinding wheel spindle, means operable by said source for rotating said grinding wheel spindle, a screw and nut mechanism for imparting axial movements to said spindle, a variable speed gearing for transmitting relative rotation at different speeds and in same direction to said screw and nut mechanism, a work spindle, and gearing interconnecting said work spindle and screw and nut mechanism.

3. A grinding machine as claimed in claim 2 and having means dependent on the axial movements of said grinding wheel spindle for controlling the variable speed gearing to cause relative rotation of said screw and nut at different speeds and in the same direction.

4. A machine as claimed in claim 2, in which the variable speed gearing comprises the combination of wheels adapted to transmit motion at two different speeds relatively to the grinding wheel spindle, a unidirectional clutch associated with the wheels which transmit motion at the lower speed, and clutching means responsive to axial movements of the grinding wheel spindle for controlling the wheels which transmit motion at the higher speed.

5. A grinding machine of the kind specified, comprising in combination a source of rotary motion, a rotatable and axially slidable grinding wheel spindle connected to said source of motion, a screw extending from one end of said spindle, a rotatable but axially immovable nut engaging said screw, a variable speed gearing for transmitting rotation at different speeds and in the same direction to said nut, a work spindle, gearing interconnecting said work spindle and nut so that rotation of said nut is accompanied by rotation of said work spindle, and means dependent on axial movements of said grinding wheel spindle for controlling said variable speed gearing.

6. A machine as claimed in claim 2, in which the variable speed gearing comprises the combination of wheels adapted to transmit motion at two different speeds relatively to the grinding wheel spindle, a unidirectional clutch associated with the wheels which transmit motion at the lower speed, and clutching means responsive to axial movements of the grinding wheel spindle for controlling the wheels which transmit motion at the higher speed, the said gearing having combined with it an additional gearing adapted to transmit motion at the same speed as the grinding wheel spindle, and clutching means adapted to bring the additional gearing into action automatically when the clutching means associated with the variable speed gearing is inoperative.

AXEL CHARLES WICKMAN.

REFERENCES CITED

The following references are of record in the file of this patent:

UNITED STATES PATENTS

| Number | Name | Date |
|---|---|---|
| 1,693,781 | Hanson | Dec. 4, 1928 |
| 1,773,677 | Herrmann | Aug. 19, 1930 |
| 1,842,538 | Burgress | Jan. 26, 1932 |
| 2,385,650 | Rickenmann | Sept. 25, 1945 |